March 24, 1970 W. SCHRÖDER 3,502,805

METHOD AND APPARATUS FOR ENHANCING THE SUPPRESSED DOT STRUCTURE OF TELEVISION PICTURES

Filed March 29, 1967 2 Sheets-Sheet 1

INVENTOR
WOLFGANG SCHRÖDER

BY Percy P. Lantzy

ATTORNEY

INVENTOR
WOLFGANG SCHRÖDER

BY

ATTORNEY

United States Patent Office 3,502,805

Patented Mar. 24, 1970

3,502,805

METHOD AND APPARATUS FOR ENHANCING THE SUPPRESSED DOT STRUCTURE OF TELEVISION PICTURES

Wolfgang Schröder, Feldrennach, Germany, assignor to International Standard Electric Corporation, New York, N.Y., a corporation of Delaware Filed Mar. 29, 1967, Ser. No. 626,876
Claims priority, application Germany, Apr. 23, 1966, St 25,276
Int. Cl. H04n 5/58
U.S. Cl. 178—6.8 6 Claims

ABSTRACT OF THE DISCLOSURE

For a television picture having a suppressed dot structure, missing picture points are replaced in the case of equally shaded picture areas or surfaces, and not filled in where the neighboring picture points have insufficient information equality.

BACKGROUND OF THE INVENTION

Field of the invention

The present invention relates to a method of transmitting and/or reproducing television pictures in which the picture points or elements of a television picture are distributed in a predetermined timely order of succession, to two or more fields (partial pictures), so that information gaps will appear between the transmitted or reproduced picture points of a field, and then filled-in with artificial picture points.

DESCRIPTION OF THE PRIOR ART

Methods are known in which the picture points of a television picture are transmitted and/or reproduced in accordance with a predetermined timely order of succession, e.g. in a cyclical permutation. Thus, for example, in line interlacing, the odd lines are transmitted and reproduced in one field, and the even lines are transmitted and reproduced in the successively following field. Methods are also used in which the picture points lying in one line, are reproduced by being interlaced throughout two or more successively following fields; for example, in the first field the odd ones, and in the second field the even picture points. This makes it possible to change the even and the odd dot position from line to line, in order to produce a diagonal picture structure which is less annoying than a vertical structure. These arrangements save transmission bandwidths, and reduce the flicker effect in line interlacing.

A further method for reducing the transmission bandwidths, is a speed control of the scanning process which depends upon the information content. For example, a group of four neighbouring picture points is compared with other neighbouring groups, and if no significant differences appear, only one information signal is transmitted representing the whole group.

Another method compares the signal intensities of neighbouring picture points and selects the portion of the video signals to be transmitted. This comparison requires costly equipment, such as cathode-ray tubes, magnetic tapes and magnetic drums.

A recent method avoids this expenditure by performing a periodic selection of transmitted picture points independently of their information contents (see e.g. German Patent No. 1,193,087). The non-transmitted information items are synthetically obtained from the neighbouring information items, by constituting a mean value therebetween. The constitution of this mean value (average) is effected by way of wobbling the scanning electron beam in addition to the vertical deflection. At both the receiving and reproducing end the synchronized wobbling (sweeping in frequency) is performed in the same way. Since the expenditure required for the wobbulator at both the transmitting and receiving end, including the synchronizing arrangement, is relatively high, and since existing television standards cannot be included in this system, the present invention proposes a principle which is compatible with the existing television standards.

This principle reduces the bandwidth in a known manner, by effecting a periodic cyclically permutating skipping of certain picture points. These points are then reproduced in the field which contains the previously skipped transmitted picture points. This system is capable of reproducing the complete number of picture points of the transmitted picture without any noteworthy losses; it merely changes the formation of the structure. For example, if the structure were to be blurred by a simple forming of the mean value according to known methods, this would result in a loss of resolution of the picture. If the formation of the mean value is effected by way of wobbling (frequency sweeping) in the vertical deflecting direction, there is practically half the number of lines. Likewise, it is not possible to compensate for the loss of contrast due to the skipped brightness information.

SUMMARY OF THE INVENTION

The aforementioned disadvantages are overcome by a simple method of enhancing the dot structure, based on the recognition that these structures only have a disturbing effect to the viewer in the more extensive, equally toned picture areas. Accordingly, it is sufficient to fill in the periodically missing picture points only in these areas with the same brightness value as the previously and successively transmitted picture point, to effect corresponding brightness control of the picture reproducing arrangement. Unlike the conventional method, no additional control is required at the transmitting end in addition to the normal television standard. And at the receiving end, there is no need for a wobbulating arrangement (frequency sweep arrangement) which, in distinction to the invention, is incapable of adding to the recovery of the normal medium picture brightness.

The invention is characterised by the fact that the information gaps are only filled with the information of either the preceding or the subsequently following picture point in the case of an information equality, or sufficient equality within a predetermined tolerance of both the preceding and the subsequently following picture point. The gaps remain unfilled in the case of an insufficient information equality of neighbouring picture points.

The relative brightness differences between a filled and a non-filled picture portion are compensated for by a correspondingly controlled intermediate amplifier.

DESCRIPTION OF THE DRAWINGS

The invention will now be explained in detail with reference to FIGS. 1 to 5 of the accompanying drawings, in which.

DESCRIPTION OF THE PREFERRED EMBODIMENTS

Figure 1A:
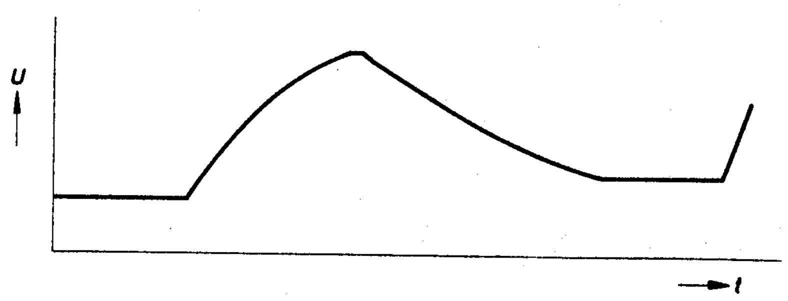
FIGURES 1*a* thru 1*c* illustrate a well known decomposition of a picture signal.
Figure 1B:
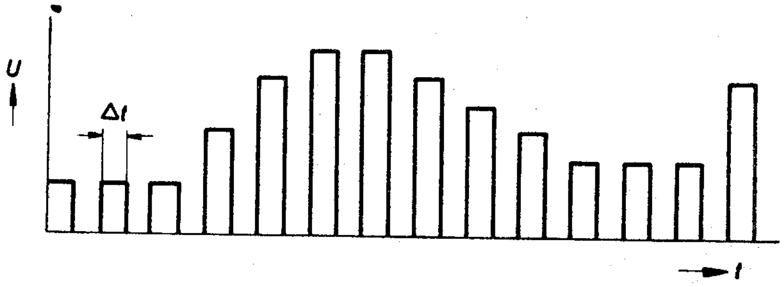
Figures 1C, 2:
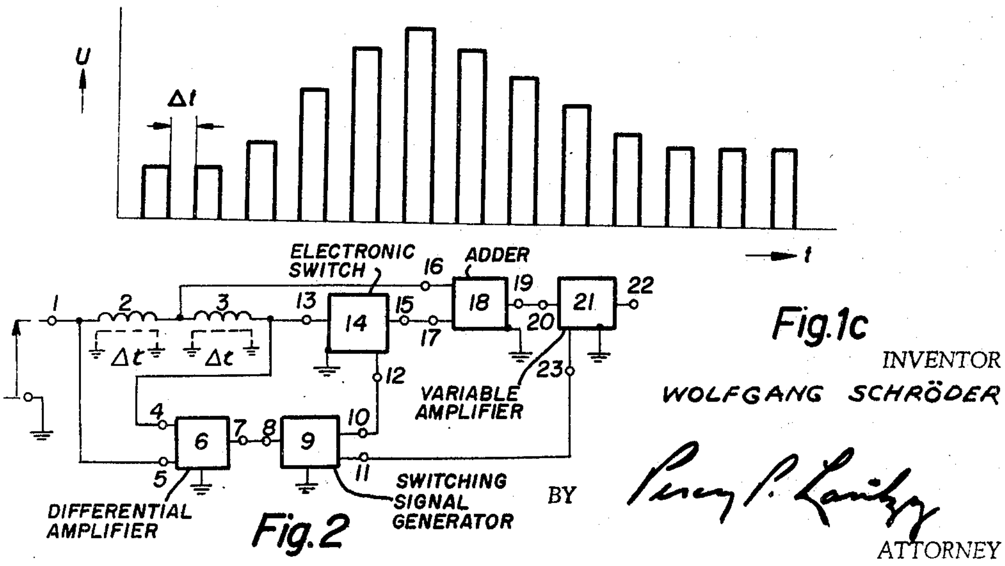
FIGURE 2 shows a circuit arrangement to carry out the inventive method.

FIG. 1 shows the pulse sequence resulting from the well known decomposition of a picture signal, the signal ›f FIGURE 1*a* of a television line is decomposed into two ımplitude-modulated trains of rectangular pulses FIG. :*b* (first field) and FIG. 1*c* (second field). These fields ıre displaced with respect to one another by the time $\Delta t$, ınd are reproduced in two successively following fields or n two successively following lines.

FIG. 2 shows in a schematic form a circuit arrangenent for carrying out the filling up of the keying inter-'als of a train of rectangular pulses (FIGS. 1*b* and 1*b*) .s proposed in accordance with the present invention.

For example, if such an amplitude-modulated train of ectanguar pulses is applied to the picture signal input 1, t will be subjected, in the two arrangements 2 and 3 FIG. 2) each of which effecting a delay $\Delta t$, to a delay ›f altogether $2\times\Delta t$. The desired time delays, for example, nay be achieved with the aid of corresponding sections of . delay line. Input 4 of the differential amplifier 6 the ignal delayed by $2\times\Delta t$ and will coincide with the signal ⁄hich is fed in a non-delayed manner by the input 5 for n amplitude comparison.

Figure 3:
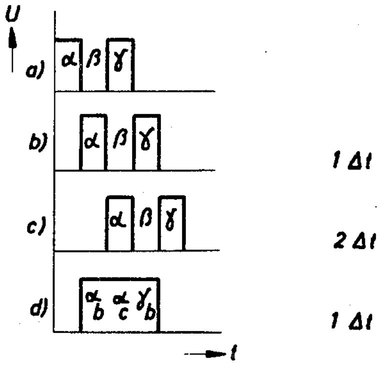
FIGURE 3 is used to explain FIGS. 2 and 4.

FIG. 3, with reference to a double rectangular pulse, lustrates: (a) the direct transmission (without the time elay), (b) a transmission delayed by $\Delta t$, and (c) a transnission delayed by $2\times\Delta t$. The individual phases of the ulse train are designated $\alpha$, $\beta$, $\gamma$. If, in the differential mplifier, there are compared with one another the pulse ıortion $\gamma$ of the pulse train according to FIG. 3*a* and the ulse portion $\alpha$ of the pulse train according to FIG. 3*c*, o output voltage will result at the output 7 of the differntial amplifier 6 in FIG. 2, because the amplitude differnce of both pulse portions $\alpha$ and $\gamma$ equals zero.

The arrangement 9 for producing or generating the witching signal will in this case not generate a switchff or switch-over signal for the electronic switch 14 and ıe reversible amplifier 21, and the train of rectangular ulses as delayed by $2\times\Delta t$, from the time delay arrangeıent 3, will pass the electronic switch 14 via the input 3 and the output 15. The adding stage (adder) 18 will ıen receive, via the input 17, a train of rectangular pulses elayed by $2\times\Delta t$, and a train of rectangular pulses deıyed by $1\times\Delta t$ via the input 16 from the time delay arıngement 2. Both will appear at the output 19 of the dder 18 superposed in such a way as is illustrated in 'IG .3*d*: the pulse gap $\beta$ (FIG. 2*b*) is filled by the pulse f FIG. 2*c* as delayed by $\Delta t$.

Accordingly, there will result the pulse sum $\alpha_b\alpha_c\delta_b$ FIG. 3*d*). The pulse phase $\delta$ (of FIG. 3*c*) is switched ff with respect to the pulse train of FIG. 3*d* (as explained ı the course of the description. In this way there is voided the otherwise visible intermediate structure of the icture and at the same time there is doubled the reprouced light current with respect to a non-filled-up reprouction.

In cases where the non-delayed signals and the signals elayed by $2\times\Delta t$ are compared and found to be unequal, ıe differential amplifier 6 will produce at its output 7 signal deviating in either the positive or the negative irection, and will transmit it to the arrangement 9 for roducing a switching signal. At the outputs 10 and 11 ıere will then appear a predetermined switching signal f the required polarity and voltage, which may be indeendent of polarity and amplitude, but which may also e chosen as a corresponding function of the difference ppearing at 7 and 8. The arrangement 9 for producing ıe switching signal, will be described hereinafter. In the resence of a difference signal at the input 8, a disconecting voltage is supplied via the output of 10 to the ɔntrol input 12 of the electronic switch 14, for interıpting the signal passage between 13 and 15.

Since the adder 18, in this particular case, will only ansfer the signal as existing at the input 16, only the gnal as delayed by $1\times\Delta t$ will appear at the output 22 ፡ the variable amplifier 21, the input of which is desigated by the reference numeral 20, with the pulse gaps ːmaining unchanged. In view of the light current which, during the picture reproduction, is reduced to one half, the loss of brightness is compensated by switching over the amplifier 21 to a correspondingly higher amplification.

If the generation of the switching signal, however, is controlled as a function of the differential signal as applied to the input 8, for example, in such a way that at the outputs 10 and 11 there appears an amplitude variation which is dependent upon the absolute amount of difference, it is possible to use instead of the electronic switch 14, a variable amplifier 14 with the signal input 13, the signal output 15, and the control or regulating input 12 for controlling the gain factor. In that case the amplifier 21 may be laid out accordingly, and may be regulated at its regulating or control input 23 for continuously in dependence upon the chosen "filling factor."

Figure 4A:
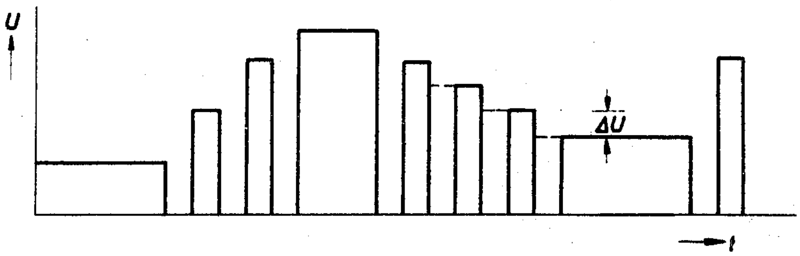
FIGURE 4*a* and 4*b* shows the decomposition of a picture signal according to the inventive method.
Figure 4B:
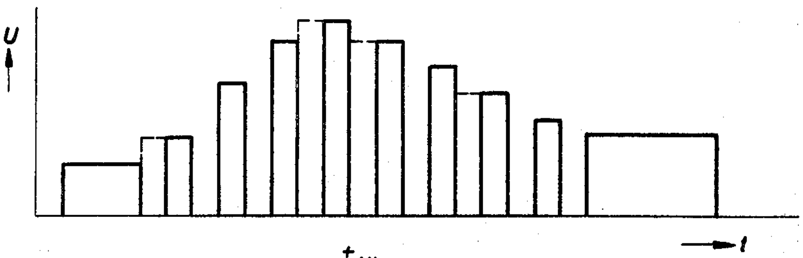

From FIG. 4*a* it may be recognized how the trains of rectangular pulses of FIG. 1*b* (first field), and correspondingly from FIG. 4*b*, how the trains of rectangular pulses of FIG. 1*c* (second field) are deformed to the shape of continuous longer rectangular pulses subsequently to them passing through the arrangement according to FIG. 2, in cases where their amplitudes are alike each other or almost alike. When assigning a certain tolerance $\Delta u$ to the admissible amplitude deviations (FIG. 4), it is possible to achieve with a certain allowance for a more coarse grey scale, a more extensive structure suppression in the television picture. In FIG. 4 this is denoted by the dash-lined portions of the rectangular curves. Only after the amplitude differences exceed the tolerance threshold $\Delta u$, a switching signal will be generated with the aid of which the transmission of a preceding pulse to the subsequently following gap will be either suppressed or weakened.

Figure 5:
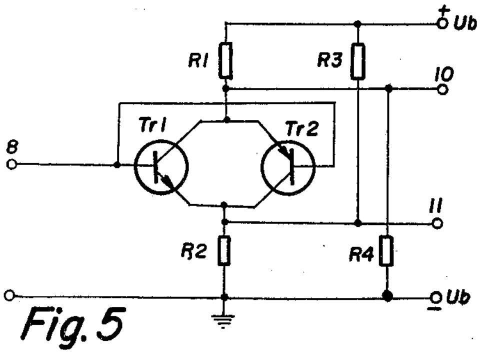
FIGURE 5 shows a circuit arrangement for carrying out the inventive method.

The switching signal generator (FIG. 2, arrangement 9), which is required for regulating the amplifier 14 and 21, or for controlling the electronic switch 14, may be described with reference to FIG. 5.

The differential signal, as supplied by the previously mentioned differential amplifier 6, is fed via the input 8, to the parallel-connected base electrodes of transistors T*r*1 ano T*r*2. If the differential signal is positive with respect to the reference potential ($-U_b$), the transistor T*r*1 becomes unblocked, while the transistor T*r*2 becomes blocked, and on account of the voltage drop across R1, a voltage will appear at the output 10, which is more negative with respect to the previous quiescent potential, and on account of the voltage drop across R2, there will appear a voltage which is more positive with respect to the previous quiescent potential.

The same voltage drops and polarities, however, will also appear at the same outputs 10 and 11 if the transistor T*r*2 is rendered conductive (unblocked) in the case of a negative differential voltage appearing at the input 8, and if the transistor T*r*1 is blocked.

If the differential voltage at the input 8 is zero, or is lying within the positive and negative biasing voltage tolerances as chosen with the aid of the voltage dividers R1/R4 and R2/R3, both transistors will remain blocked, and the quiescent potentials as adjusted with the aid of the aforementioned voltage dividers will appear at the outputs 10 and 11.

The example according to FIG. 2 shows how the information gaps of a picture signal are filled out with the information of a stored signal after the preceding information has been compared with the information following the gap. In the same way it is also possible to fill a preceding information gap with a subsequently following information, to which end in the adder 18 it is merely necessary for the signal directly applied to 1, to be applied to the input of stage 16, and for the signal which has been once delayed by $\Delta t$, and which may be taken off after the time delay arrangement 2, to be applied to the input 13 of the variable amplifier or of the electronic switch 14, respectively.

The aforementioned examples refer to amplitude-modulated pulses. Without requiring any modification, however, the arrangement according to FIG. 2 may also be applied to other types of modulation provided that the variable amplifier 21 is either adapted to the modulation principle, or contains an arrangement having a transcoding effect upon amplitude modulation. The same also applies to the arrangement 14 if this arrangement is supposed to operate as a variable amplifier and not as an electronic switch.

The method according to the present invention is particularly suitable for increasing the transmitting or reproducing bandwidths of video tape recorders by way of dot interlace.

While I have described above the principles of my invention in connection with specific apparatus and method steps, it is to be clearly understood that this description is made only by way of example and not as a limitation on the scope of my invention, as set forth in the accompanying claims.

I claim:

1. A method of enhancing the suppressed dot structure of television pictures comprising the steps of:

transmitting picture points of one picture which are distributed in a predetermined timely order of succession in two or more fields so that information gaps appear between the transmitted picture points of one field;

receiving said picture points with information gaps;

filling said information gaps with artificial picture points with information of the preceding or subsequently following picture point in the case of information equality, or if the equality of the preceding and subsequently following picture point is sufficient within a given tolerance; and leaving said information gaps unfilled in cases of an insufficient information equality of the neighboring picture points.

2. A method according to claim 1, including the step of compensating for the loss of brightness caused by said information gaps by controlling either the gain or the degree of modulation.

3. Apparatus for enhancing the suppressed dot structure of television pictures comprising:

an input pulse train representing transmitted picture points of one field of the transmitted picture and having information gaps between the transmitted picture points;

delay means coupled to said input effecting a delay output $\Delta t$ and $2\Delta t$;

differential means being coupled to said input and $2\Delta t$ delay output, said differential means to produce an output voltage indicative of the amplitude difference between the input pulse which coincides with said $2\Delta t$ delayed output pulse;

signal generating means responsive to said output voltage for controlling an electronic switch which is coupled to said $2\Delta t$ delay output;

an adding stage being coupled to receive said delayed output $\Delta t$ and, via said electronic switch, said delayed output $2\Delta t$, and said adding stage to produce a composite pulse filling-in said information gaps according to the control signal of said signal generating means; and a variable output amplifier coupled to said adding stage and said signal generating means for producing the enhanced suppressed dot structure.

4. Apparatus according to claim 3, wherein the loss of brightness caused by said information gaps is compensated by switching over said output amplifier to a higher amplification by an additional control signal from said signal generating means.

5. Apparatus according to claim 4, in which said electronic switch is another variable amplifier, which is controlled by said signal generating means which in turn is dependent upon the absolute amount of difference in voltage output of said differential means, whereby said other variable amplifier will only be switched after the amplitude difference exceeds a tolerance threshold $\Delta u$.

6. Apparatus according to claim 5, wherein said signal generating means comprises:

first and second transistors having parallel-connected base electrodes, the collector of said first transistor being connected to the emitter of said second transistor and the collector of said second transistor being connected to the base of said first transistor;

a source of reference potential coupled to said transistors by means of voltage divider resistors to set the quiescent potential on the collector output of each transistor; and a differential signal voltage applied to the base of said transistor drives one of said transistors "on" and the other transistor "off," whereby the quiescent potential existing of the collector of the "on" transistor is changed.

References Cited

UNITED STATES PATENTS 2,921,124 1/1960 Graham.
3,366,739 1/1968 Parkinson.

JOHN W. CALDWELL, Primary Examiner
H. W. BRITTON, Assistant Examiner

U.S. Cl. X.R.

178—6